United States Patent
Blackwell et al.

(10) Patent No.: US 8,238,533 B2
(45) Date of Patent: Aug. 7, 2012

(54) TELECOMMUNICATIONS LEAST COST ROUTING SYSTEM

(75) Inventors: Kyle Blackwell, Los Lunas, NM (US);
Tony Casarez, San Diego, CA (US);
Kenneth Case, San Diego, CA (US);
Dan Graf, Ramona, CA (US); Percival Verayo, San Diego, CA (US)

(73) Assignee: Cricket Communications, Inc., San Diego, CA (US)

( * ) Notice: Subject to any disclaimer, the term of this patent is extended or adjusted under 35 U.S.C. 154(b) by 1152 days.

(21) Appl. No.: 12/014,030

(22) Filed: Jan. 14, 2008

(65) Prior Publication Data

US 2009/0180600 A1    Jul. 16, 2009

(51) Int. Cl.
*H04Q 3/66*     (2006.01)
*H04M 15/00*    (2006.01)
*H04L 12/56*    (2006.01)
*H04B 7/185*    (2006.01)
*G08G 1/123*    (2006.01)

(52) U.S. Cl. ............... 379/114.28; 370/235; 370/238; 370/260; 370/352; 370/392; 379/112.01; 379/114.02; 379/114.1; 379/115.02; 379/221.01; 455/456.1; 705/26.1; 705/26.81; 705/32; 705/37; 705/80

(58) Field of Classification Search .............. 370/235, 370/238, 260, 352, 392; 379/114.02, 114.03, 379/114.1, 114.2, 114.28, 221.01, 112.01, 379/115.02; 455/456.1; 705/26.1, 32, 80, 705/26.3, 26.81, 35, 37
See application file for complete search history.

(56) References Cited

U.S. PATENT DOCUMENTS

| | | | | |
|---|---|---|---|---|
| 5,917,897 | A * | 6/1999 | Johnson et al. | 379/114.02 |
| 6,005,925 | A * | 12/1999 | Johnson et al. | 379/115.02 |
| 6,078,652 | A * | 6/2000 | Barak | 379/114.02 |
| 6,104,701 | A * | 8/2000 | Avargues et al. | 370/238 |
| 6,167,124 | A * | 12/2000 | Johnson et al. | 379/112.01 |
| 6,208,719 | B1 * | 3/2001 | Lo et al. | 379/114.03 |
| 6,212,184 | B1 * | 4/2001 | Venkatachary et al. | 370/392 |
| 6,240,169 | B1 * | 5/2001 | Haskins et al. | 379/114.02 |
| 6,252,952 | B1 * | 6/2001 | Kung et al. | 379/114.1 |
| 6,584,452 | B1 * | 6/2003 | Prieto et al. | 705/37 |
| 6,771,969 | B1 * | 8/2004 | Chinoy et al. | 455/456.1 |
| 6,856,598 | B1 * | 2/2005 | Stanfield | 370/235 |
| 7,076,037 | B1 * | 7/2006 | Gonen et al. | 379/114.02 |
| 7,117,202 | B1 * | 10/2006 | Willoughby | 1/1 |
| 7,260,208 | B2 * | 8/2007 | Cavalcanti | 379/221.01 |
| 7,290,009 | B1 * | 10/2007 | Semret et al. | 1/1 |
| 7,356,487 | B2 * | 4/2008 | Kitze | 705/26.3 |
| 7,729,944 | B1 * | 6/2010 | Peyser et al. | 705/26.81 |
| 7,797,193 | B1 * | 9/2010 | Peyser et al. | 705/26.1 |
| 7,969,916 | B2 * | 6/2011 | Kizhnerman | 370/260 |

(Continued)

*Primary Examiner* — Gerald Gauthier
(74) *Attorney, Agent, or Firm* — Knobbe Martens Olson & Bear LLP

(57) ABSTRACT

Methods, systems, and apparatus for populating a least cost routing database. In one aspect, a method includes receiving from a carrier a bid for routing a telephone call to a destination; automatically loading the received bid into a least cost routing database to generate an updated least cost routing database; and making the updated least cost routing database accessible for use in determining one or more least cost routes. Further, the received bid can be analyzed to generate a projected business result and the projected business result can be presented to the carrier before loading the received bid into the least cost routing database. Additionally, input can be received from the carrier specifying an historical period and the projected business result can be generated based on data associated with the specified historical period.

25 Claims, 7 Drawing Sheets

U.S. PATENT DOCUMENTS

| | | | |
|---|---|---|---|
| 8,131,616 B2 * | 3/2012 | Semret et al. | 705/35 |
| 2003/0074329 A1 * | 4/2003 | Jandasek et al. | 705/80 |
| 2005/0004846 A1 * | 1/2005 | Dresden | 705/26 |
| 2005/0281199 A1 * | 12/2005 | Simpson et al. | 370/238 |
| 2008/0154755 A1 * | 6/2008 | Lamb, III | 705/32 |
| 2009/0180600 A1 * | 7/2009 | Blackwell et al. | 379/114.28 |
| 2009/0310600 A1 * | 12/2009 | Kung et al. | 370/352 |

* cited by examiner

Carrier: MobileCom
From: 02/17/07  To: 02/18/07

| Area Code | Region | Duration | Actual Carrier | Actual Cost | Projected Carrier | Projected Cost |
|---|---|---|---|---|---|---|
| 858 | San Diego | 2134 | Telecom1 | 40.7507 | MobileCom | 38.2332 |
| 858 | San Diego | 2926 | MobileCom | 55.8925 | MobileCom | 49.3234 |
| 858 | San Diego | 555 | VoiceCom | 7.848 | VoiceCom | 7.848 |
| 858 | San Diego | 772 | BigSat | 15.8315 | MobileCom | 11.8765 |

FIG. 5

TELECOMMUNICATIONS LEAST COST ROUTING SYSTEM

TECHNICAL FIELD

The present disclosure relates to telecommunications systems, e.g., to systems and methods for determining a route for a call and routing the call through a telecommunications system in accordance with a least cost routing strategy.

BACKGROUND

Telephone calls have been automatically routed through the Public Switching Telephone Network (PSTN) for as long as modern telephone switching equipment has existed. A telephone number corresponding to World Zone 1, which includes the United States, has a three digit Numbering Plan Area code (or NPA) and a three digit Exchange code (or NXX). Each NPA/NXX represents a telephone exchange. Further, each NPA/NXX combination is controlled by an operating company, designated by an Operating Company Number (OCN).

Telephone calls originating (calling party) and terminating (called party) in telephone exchanges controlled by different operating companies are routed between operating companies. Interexchange carriers, such as long distance companies, carry communications traffic between the telephone exchanges. In the past, communications traffic consisted of voice traffic that was transmitted in analog form. More recently, communications traffic has expanded to encompass voice and data traffic that are transmitted in digital form, such as in one or more data packets.

In order to create wireline regulation, the United States and Canada were divided into Local Access and Transport Areas (LATAs). A LATA corresponds to a geographical region in which a divested Regional Bell Operating Company (RBOC) is permitted to offer exchange telecommunications and exchange access services. The interexchange carriers provide routes between LATAs. Further, Telcordia Technologies publishes the Local Exchange Routing Guide (LERG), which is a monthly guide used to determine the routing of telecommunications services between LATAs. Therefore, interexchange carriers can access the LERG to determine one or more call routing options.

The rates charged by the interexchange carriers were previously determined through contract negotiations and were typically valid for an extended period of time. Generally, once an agreement with an interexchange carrier was reached, the interexchange carrier exclusively performed call routing between one or more originating and terminating points. Alternatively, a particular interexchange carrier could be designated as the carrier for all of a subscriber's long distance telephone calls. The rates applied to interexchange routing did not change frequently, as accurate billing depended on being able to determine the applicable rate for a particular call routed through an interexchange carrier.

With the wide-spread adoption of mobile communications, however, competition between interexchange carriers increased. Service providers were able to develop routing tables that compared the rates charged by various interexchange carriers. Further, service providers could make routing decisions based on the rates charged by the interexchange carriers. Because the rates were provided and entered into the routing tables manually, however, the rates associated with an interexchange carrier were only modified periodically.

SUMMARY

A telecommunications system, such as a network associated with a wireless service provider, can be configured to perform least cost routing of service requests, such as long distance calls originated by telecommunications system subscribers. Further, the least cost routing can be performed such that bids placed by a plurality of third-party carriers are evaluated for each service request that is routed through the telecommunications system. In order to permit timely identification of one or more least cost routes, the present inventors recognized that it is beneficial to route voice service requests using Voice over Internet Protocol (VoIP).

The present inventors also recognized a need for third-party service providers to be able to place bids for providing connections through their respective networks based on the origination and termination locations on a call-by-call basis. For example, with respect to calls that originate in San Diego, a third-party service provider can bid a first rate for a call that will terminate in Los Angeles and a second rate for a call that will terminate in Miami. Further, a need for a third-party service provider to be able to update bids independently also was recognized. Additionally, the present inventors also recognized a need to provide a default route which can be used if the one or more least cost routes are unavailable at the time a call is to be routed. Accordingly, the techniques and apparatus described here implement algorithms for determining a route for a call and routing the call through a telecommunications system in accordance with a least cost routing strategy.

In general, in one aspect, the subject matter can be implemented to include receiving from a carrier a bid for routing a telephone call to a destination; automatically loading the received bid into a least cost routing database to generate an updated least cost routing database; and making the updated least cost routing database accessible for use in determining one or more least cost routes.

The subject matter also can be implemented such that the bid is received from the carrier over a network. Further, the subject matter can be implemented such that the destination is represented by a Local Access and Transport Area identifier. The subject matter also can be implemented such that receiving a bid further comprises receiving a file identifier corresponding to a file comprising one or more bids. Additionally, the subject matter can be implemented to include validating the received bid based on one or more business rules before loading the received bid into the least cost routing database.

The subject matter also can be implemented to include analyzing the received bid to generate a projected business result; and presenting the projected business result to the carrier before loading the received bid into the least cost routing database. Further, the subject matter can be implemented to include receiving input from the carrier specifying an historical period; and generating the projected business result based on data associated with the specified historical period. Additionally, the subject matter can be implemented such that automatically loading the received bid into the least cost routing database further comprises replacing a corresponding previous bid.

In general, in another aspect, the techniques can be implemented as a computer program product, encoded on a computer-readable medium, operable to cause data processing apparatus to perform operations including receiving from a carrier a bid for routing a telephone call to a destination; automatically loading the received bid into a least cost routing database to generate an updated least cost routing database; and making the updated least cost routing database accessible for use in determining one or more least cost routes.

The subject matter also can be implemented such that the bid is received from the carrier over a network. Further, the subject matter can be implemented such that the destination is represented by a Local Access and Transport Area identifier.

Also, the subject matter can be implemented such that receiving a bid further comprises receiving a file identifier corresponding to a file comprising one or more bids. Additionally, the subject matter can be implemented to be further operable to cause data processing apparatus to perform operations including validating the received bid based on one or more business rules before loading the received bid into the least cost routing database.

The subject matter also can be implemented to be further operable to cause data processing apparatus to perform operations including analyzing the received bid to generate a projected business result; and presenting the projected business result to the carrier before loading the received bid into the least cost routing database. Further, the subject matter can be implemented to be further operable to cause data processing apparatus to perform operations including receiving input from the carrier specifying an historical period; and generating the projected business result based on data associated with the specified historical period. Additionally, the subject matter can be implemented to be further operable to cause data processing apparatus to perform operations including replacing a corresponding previous bid upon automatically loading the received bid into the least cost routing database.

In general, in another aspect, the subject matter can be implemented as a system including a computer-readable medium storing a least cost routing database; and a computing system including processor electronics configured to perform operations comprising receiving from a carrier a bid for routing a telephone call to a destination; automatically loading the received bid into the least cost routing database to generate an updated least cost routing database; and making the updated least cost routing database accessible for use in determining one or more least cost routes.

The subject matter also can be implemented such that the bid is received from the carrier over a network. Further, the subject matter can be implemented such that the destination is represented by a Local Access and Transport Area identifier. Also, the subject matter can be implemented such that receiving a bid further comprises receiving a file identifier corresponding to a file comprising one or more bids. Additionally, the subject matter can be implemented such that the processor electronics are further configured to perform operations including validating the received bid based on one or more business rules before loading the received bid into the least cost routing database.

The subject matter also can be implemented such that the processor electronics are further configured to perform operations including analyzing the received bid to generate a projected business result; and presenting the projected business result to the carrier before loading the received bid into the least cost routing database. Further, the subject matter can be implemented such that the processor electronics are further configured to perform operations including receiving input from the carrier specifying an historical period; and generating the projected business result based on data associated with the specified historical period. Additionally, the subject matter can be implemented such that the processor electronics are further configured to perform operations including replacing a corresponding previous bid upon automatically loading the received bid into the least cost routing database.

The techniques described in this specification can be implemented to realize one or more of the following potential advantages. For example, the techniques can be implemented such that a least cost route can be automatically determined when a call is initiated in a telecommunications system. The techniques also can be implemented such that a third-party service provider can automatically identify one or more bids for establishing a connection through their network, such as terminating a telephone call to a called party. Additionally, the techniques can be implemented to permit a third-party service provider to update one or more of their bids in real-time. The techniques also can be implemented such that a third-party service provider can receive information indicating the business impact of one or more bids, such as changes to the amount of traffic received and the revenues generated from that traffic. The techniques further can be implemented to include using one or more business rules to verify bid changes submitted by a third-party service provider.

The details of one or more implementations are set forth in the accompanying drawings and the description below. Other features and advantages will be apparent from the description and drawings, and from the claims.

BRIEF DESCRIPTION OF THE DRAWINGS

FIG. 5 shows an example of an analysis report indicating the projected effect of one or more entered rates.

Like reference symbols indicate like elements throughout the specification and drawings.

DETAILED DESCRIPTION

Figure 1:
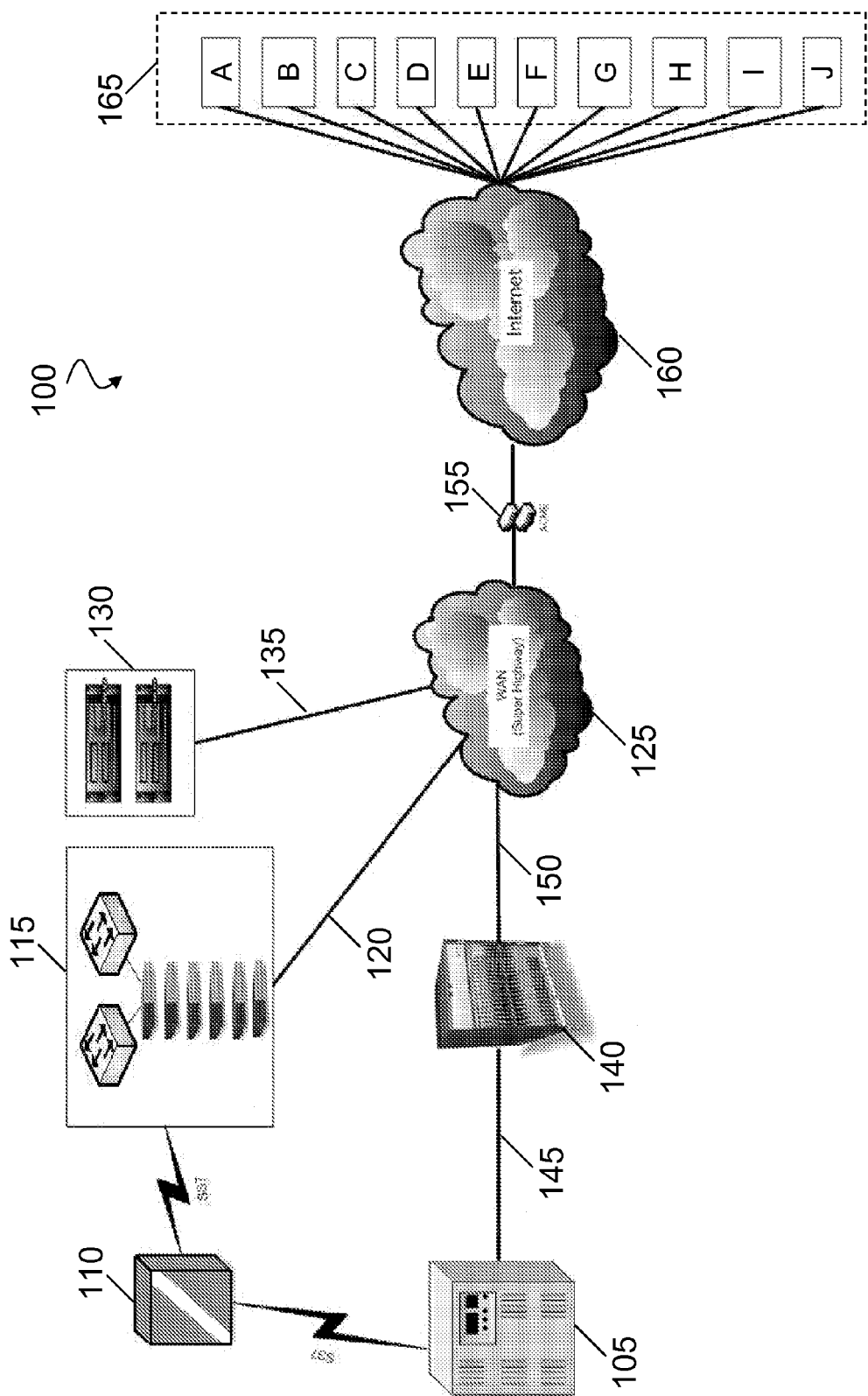
FIG. 1 shows an example of a telecommunications system configured to perform least cost routing.

FIG. 1 is an example of a telecommunications system 100 of a service provider that can be configured to perform least cost routing of service requests, such as establishing a circuit for a long distance telephone call. Telephone calls can be transmitted in the telecommunications system 100 using VoIP. The telecommunications system 100 also can be configured to establish a circuit for data transmissions. A mobile switching center 105 can receive service requests from telecommunications system 100 subscribers. For example, a subscriber can transmit a service request by dialing a telephone number on a mobile device. The service request can be routed to the mobile switching center 105 through one or more base stations included in the telecommunications system 100 and associated infrastructure.

The telecommunications system 100 also can include a Signal Transfer Point (STP) 110 that determines where a call is to be routed based on the telephone number dialed. The mobile switching center 105 and the STP 110 can communicate with one another through signaling. The STP 110 also can communicate with a soft-switch 115 through signaling. For example, the mobile switching center 105, the STP 110, and the soft-switch 115 can be configured to utilize the same signaling protocol. In some implementations, the SS7 signaling protocol can be used. The soft-switch 115 can be configured to establish the circuit used for the telephone call request received by the mobile switching center 105, including the routing and call set-up.

Further, the soft-switch 115 can include a network connection 120 to a wide area network ("WAN") 125 included in the telecommunications system 100. The network connection 120 between the soft-switch 115 and the WAN 125 can be a wired or wireless connection. For example, the network connection 120 can be implemented as an Ethernet connection, such as over 100-BaseT or Gigabit Ethernet. The WAN 125 can provide bi-directional connectivity between a plurality of communications devices included in the telecommunications system 100. A least cost routing server 130 also can include a network connection 135 to the WAN 125, which can be implemented as a wired or wireless connection, such as an Ethernet connection. Further, the soft-switch 115 can communicate bi-directionally with the least cost routing server 130 over the WAN 125, such as through exchanging one or more Internet Protocol ("IP") messages. For example, the soft-switch 115 can request and receive least cost routing information from the least cost routing server 130.

In some implementations, one or more of the communications devices included in the telecommunications system 100 can be separated from one or more other communications devices by any distance. For example, the STP 110 and the mobile switching center 105 can be located in separate rooms, separate buildings, or even separate states. The least cost routing server 130 also can be located remotely from one or more other communications devices included in the telecommunications system 100. For example, the least cost routing server 130 can be configured to provide least cost routing information for service requests received by multiple mobile switching centers.

The mobile switching center 105 further can be configured to transmit call data (also referred to as bare traffic) to a local media gateway 140. The communications link 145 between mobile switching center 105 and the local media gateway 120 can be implemented using a wired network connection, such as a Digital Signal 3 (DS3) or an Optical Carrier 3 (OC-3) connection. The local media gateway 140 also includes a network connection 150 to the WAN 125, which can be implemented using a networking protocol, such as Ethernet. Thus, the soft-switch 115 also can communicate with the local media gateway 140 over the WAN 125. For example, the soft-switch 115 can transmit information to the local media gateway 140, including call routing instructions and an identification of one or more carriers to use.

The local media gateway 140 further can be configured to convert analog call data received from the mobile switching center 105 into digital call data, which can be assembled using multiple IP packets. The IP packets generated by the local media gateway 140 can be transmitted over a network connection 150, such as an Ethernet connection, to the WAN 125. Further, the digital call data can be forwarded from the WAN 125 through a border controller 155 to the Internet 160. From the Internet 160, the digital call data can be routed to a third-party carrier 165, such as any of the carriers designated A through J, for call termination to the called party.

In an implementation, routing information including a third-party carrier used to route a call, the rate at which the telephone call is routed, and the duration of the call can be recorded, such as by the soft-switch 115 or a separate billing system (not shown). The routing information can be used to verify one or more invoices submitted to the service provider associated with the telecommunications system 100. Alternatively, the routing information can be used to automatically remit payment to one or more third-party carriers for one or more telephone calls routed through their networks. Thus, at least a portion of the payment process to reimburse third-party carriers for routed calls can be automated.

Figure 2A:
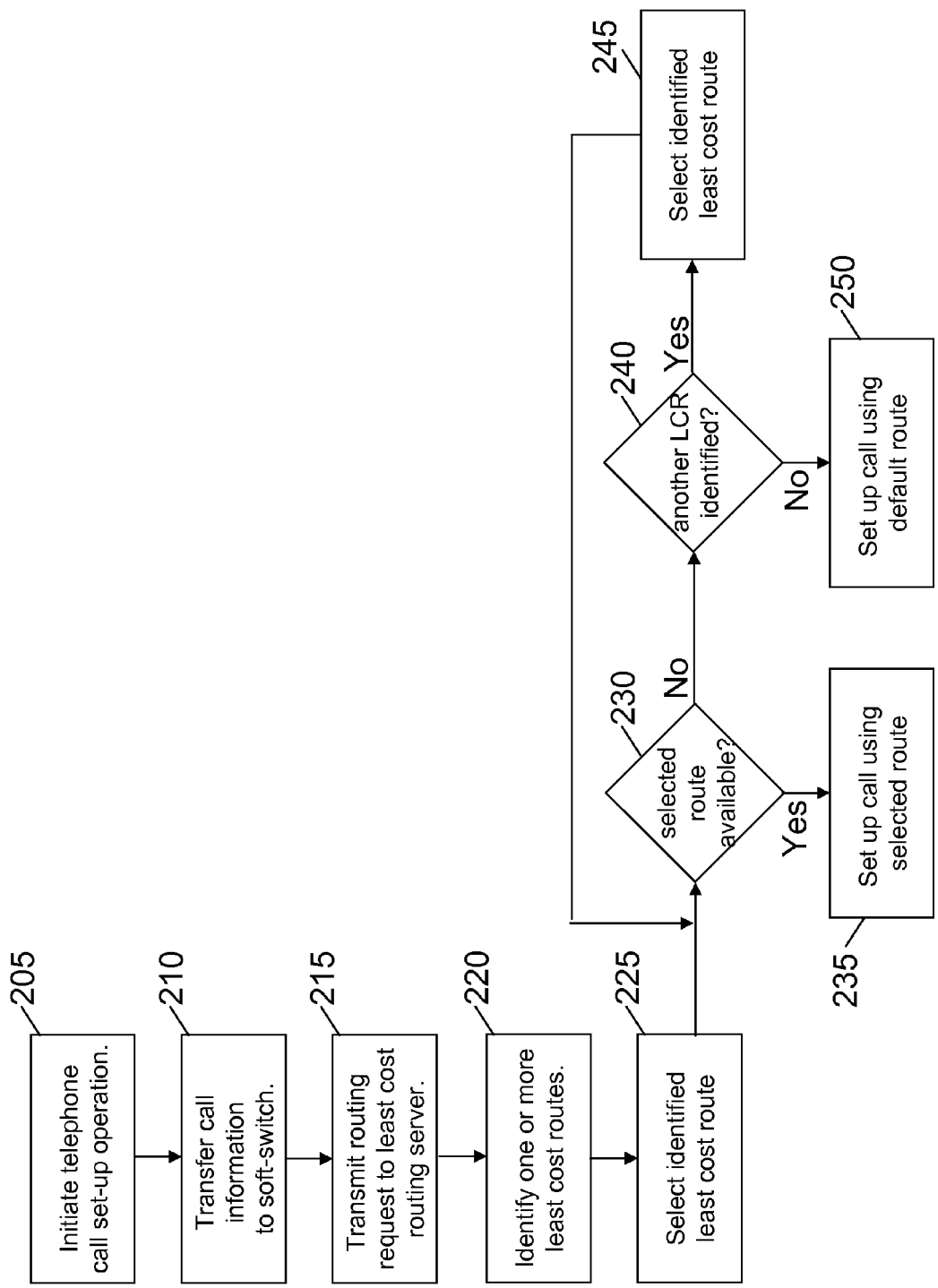
FIGS. 2A and 2B show exemplary flowcharts for performing least cost routing of a telephone call.

FIG. 2A shows an exemplary flowchart for performing least cost routing of a telephone call. A telephone call set-up operation can be initiated when a service request is received by a mobile switching center (205). The service request can be a telephone number dialed by a telecommunications system subscriber. Alternatively, the service request can be a telephone call transferred to the telecommunications system from a third-party, such as an affiliated service provider that receives least cost routing services through the telecommunications system. In performing the call set-up operation, the mobile switching center can communicate the called-party telephone number to an associated STP, indicating where the requested telephone call is to be terminated. The STP also can communicate with a VoIP soft-switch to request the routing information for the telephone call.

The telephone call information can be transferred to the soft-switch, including the origination (calling party) and termination (called party) telephone numbers (210). In some implementations, the telephone call information can be transferred by the STP. Alternatively, the telephone call information can be transferred by another system or device, such as a VoIP server. Further, the soft-switch can transmit a routing request to the least cost routing server to receive least cost routing information (215). The routing request can include information identifying the origination and termination telephone numbers for the telephone call. In response to the routing request, the least cost routing server can identify one or more least cost routes to the soft-switch (220). Further, the identified least cost routes can be ordered based on cost, from lowest to highest.

The least cost routing server can determine the least cost routes based on the termination telephone number and a database of bids from one or more third-party carriers specifying the cost for routing a telephone call through the third-party carrier network. For example, the least cost routing server can access the North American Local Exchange Routing Guide (LERG) published by Telcordia® to determine the Operating Company Number (OCN) and Local Access and Transport Area (LATA) with which the termination number is associated. The least cost routing server further can determine a bid for each of the third-party carriers serving that LATA-OCN combination. In some implementations, the third-party carrier bids can be specified in cost per minute. In other implementations, the third-party carrier bids can be specified using any standardized valuation.

The bids for each of the third-party carriers can be compared to determine one or more available least cost routes. Because it takes time to try a least cost route, the number of least cost routes identified by the least cost routing server can be constrained to a predetermined number that results in an acceptable call set-up time. Further, the call completion percentage for least cost routes can be used to determine an appropriate number of least cost routes to attempt. For example, it can be determined that attempting to route a telephone call using up to three least cost routes provides an acceptable call set-up time and results in a high percentage, such as greater than 90 percent, of telephone calls being routed on a least cost route. Thus, the least cost routing server can be configured to identify up to three least cost routes in response to a routing request. In another implementation, any number of least cost routes can be identified.

The soft-switch can select the first of the one or more least cost routes identified by the least cost routing server (225). Further, the soft-switch can determine whether the selected least cost route is available (230). For example, the selected least cost route can be saturated at the moment the call set up is attempted. As a result, the selected least cost route will not be available for the telephone call being set up. If the selected least cost route is available, the soft-switch can use the selected least cost route to perform the telephone call routing to set up the call (235). If the selected least cost route is not available, the soft-switch can determine whether another least cost route was identified by the least cost routing server (240).

If another least cost route was identified, the soft-switch can select the identified least cost route (245) and further can determine whether the selected least cost route is available (230). If no additional least cost routes are available, the soft-switch can set up the call using a default route (250). A default route can be predetermined based on one or more factors, including a very high rate of availability, such that a telephone call can be reliably routed if none of the identified least costs routes is available. The default route can be established at the switch so that a route is available even when the least cost routing server does not respond to a routing request. In some implementations, the least cost routing server also can be configured to identify a default route, such as when rate information is unavailable for a particular location.

Figure 2B:
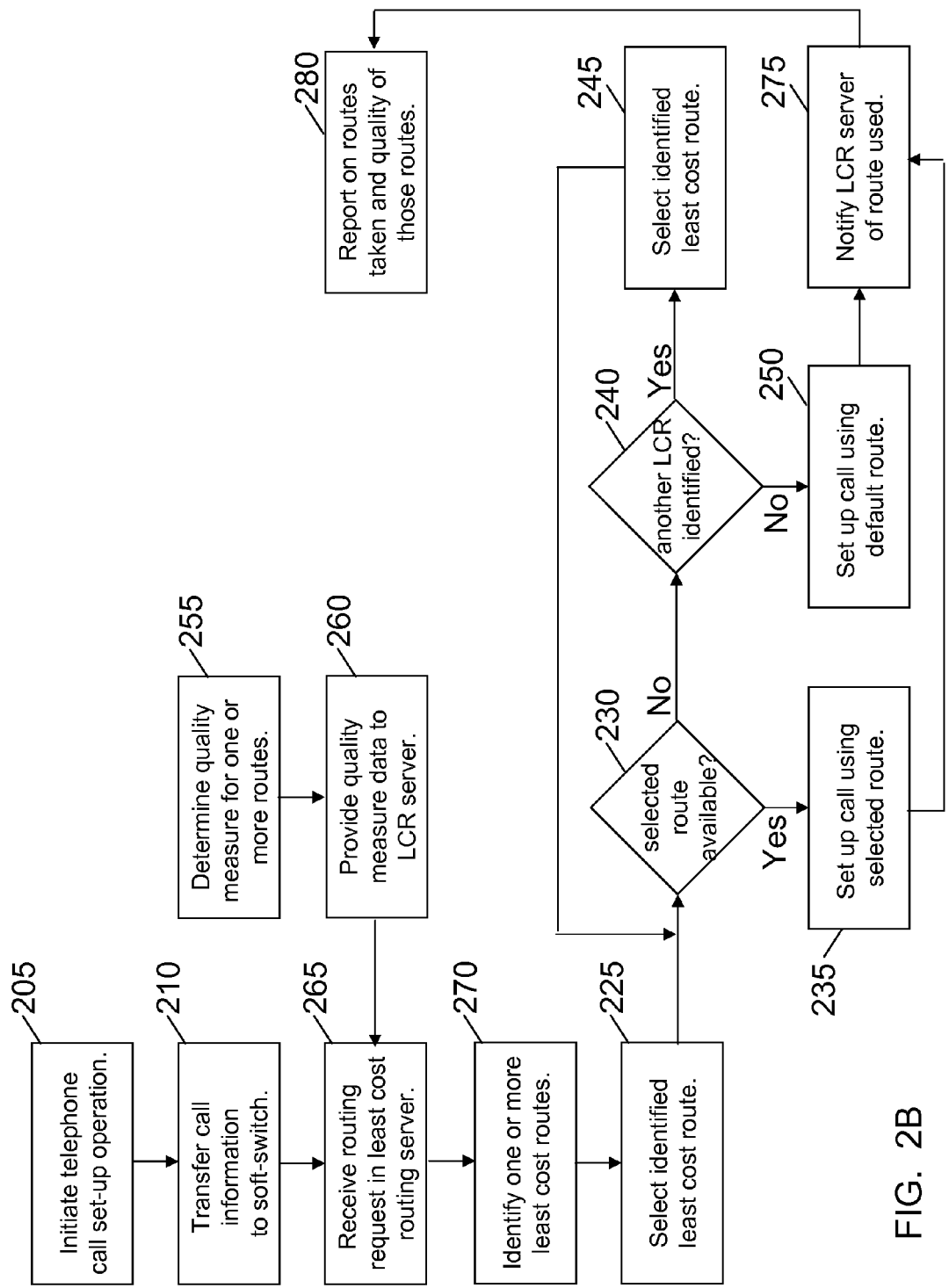

FIG. 2B shows an exemplary flowchart for performing least cost routing of a telephone call, including the generation and evaluation of one or more quality metrics. A quality measure can be determined for one or more routes (255). For example, telephone calls routed through the telecommunications system can be monitored with respect to one or more metrics or key performance indicators ("KPI"). The calls monitored can be actual telephone calls routed through the telecommunications system and/or test telephone calls placed by the monitoring device or system, which can be used to emulate actual telephone calls. The metrics collected from the monitored calls can include any of network specific metrics, such as latency and packet loss, call completion metrics, such as Answer Seizure Rate ("ASR"), Session Establishment Rate ("SER"), and Network Efficiency Rate ("NER"), and voice quality metrics, such as echo, delay, clipping, and decibel levels.

The metrics collected for a route can be used to generate a measure representative of the quality of that route for a particular period of time. For example, an International Telecommunication Union (ITU) standard Perceptual Evaluation of Speech Quality ("PESQ") score can be generated for a particular route. Alternatively, an enhanced quality measure, such as a voice perception-based PESQ score can be generated for a route. The quality measure data associated with one or more routes further can be provided to the least cost routing server (260). For example, the least cost routing server can receive a quality measure, such as a standard PESQ score or an enhanced PESQ score, and an indicator identifying the corresponding called location, such as the LATA, city, or country identifier.

Telephone call information can be transferred to the soft-switch (210). The soft-switch can transmit a routing request to the least cost routing server to receive least cost routing information (215). Further, the routing request can be received in least cost routing server (265). The least cost routing server can be configured to identify one or more least cost routes (270). The least cost routes identified by the least cost routing server can be selected based on cost and quality factors. For example, one or more least cost routes can be selected based on a charge per unit of time and a quality measure, such as an enhanced PESQ score. Further, the degree to which cost and quality are considered in selecting the least cost routes can vary depending on one or more predetermined system goals. For example, the quality measure can be weighted such that it has little influence unless its value falls below a minimum quality threshold. Alternatively, the quality measure can be weighted to greatly influence a routing determination, such as when there is little cost differentiation between third-party carriers.

The soft-switch can select the first of the one or more least cost routes identified by the least cost routing server (225). Further, the soft-switch can determine whether the selected least cost route is available (230). If the selected least cost route is available, the soft-switch can use the selected least cost route to perform the telephone call routing to set up the call (235). If the selected least cost route is not available, the soft-switch can determine whether another least cost route was identified by the least cost routing server (240). If another least cost route was identified, the soft-switch can select the identified least cost route (245) and further can determine whether the selected least cost route is available (230). If no additional least cost routes are available, the soft-switch can set up the call using a default route (250).

Once the call has been routed, the least cost routing server can be notified of the route used (275). For example, the least cost routing server can receive a termination notification when the call ends, indicating the route used and the call duration. Alternatively, the least cost routing server can determine the route used by parsing the call data records ("CDRs"). Further, the least cost routing server can report information describing the routes taken and the quality of those routes (280). For example, the least cost routing server can provide near real-time reporting of the actual routes being used and the quality measurements associated with those routes. Further, the least cost routing server can be configured to identify one or more routes that have been taken out of service, such as when a quality measurement associated with a route falls below a minimum threshold. The least cost routing server also can be configured to report information for use in historical analysis of routing decisions.

Figure 3:
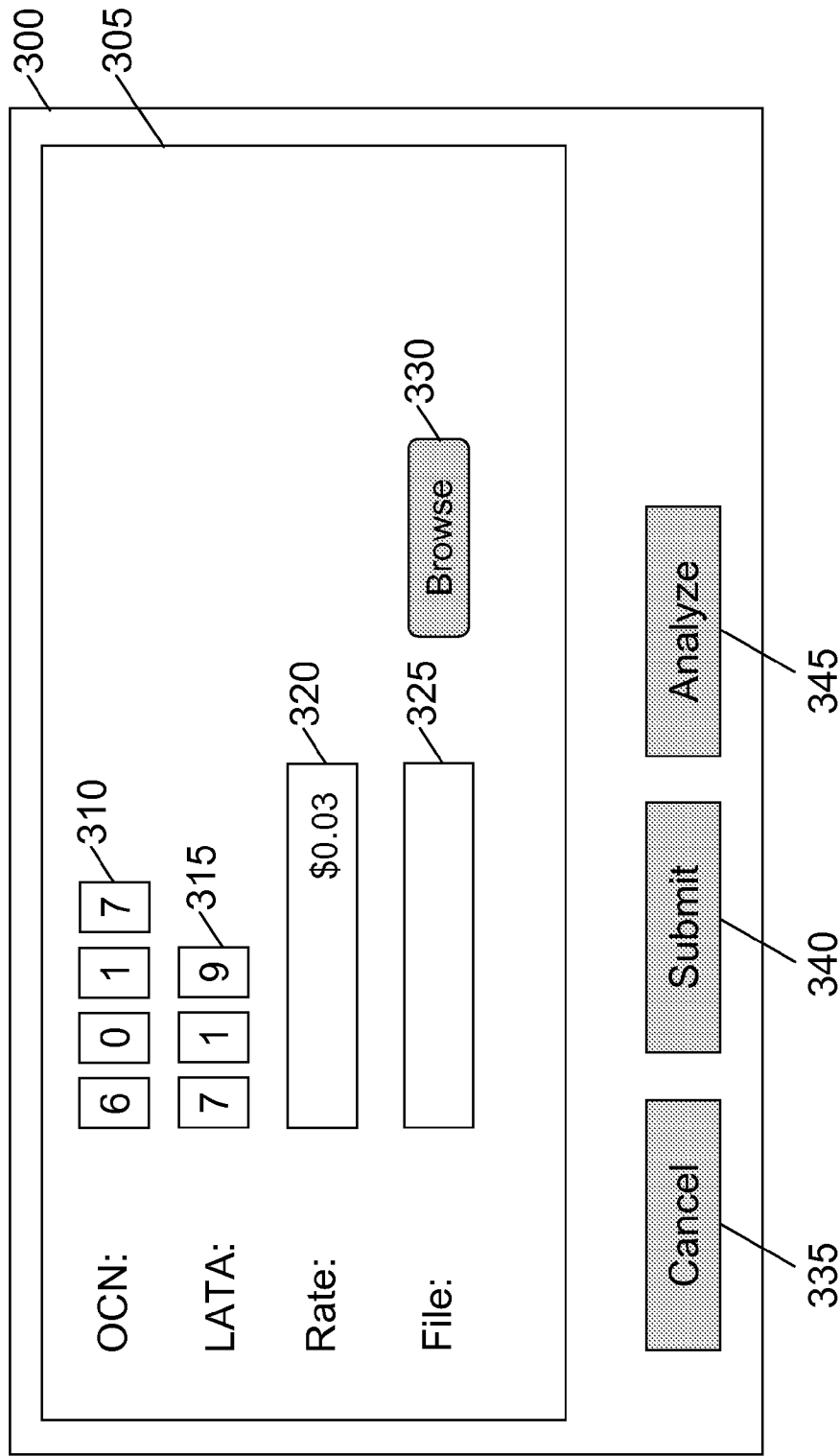
FIG. 3 shows an example of an interface screen through which one or more rates can be entered.

FIG. 3 shows an example of an interface screen 300 through which a third-party carrier can enter one or more rates (or "bids") for routing a call. The one or more rates can be used to update the rates stored in the least cost routing database corresponding to that third-party carrier. The third-party carrier can access the interface screen 300 over a network connection, such as a connection to a public or private network. In an implementation, the data communicated over the network connection can be encrypted. Further, access to the interface screen 300 can be restricted to authorized parties, such as by a password or certificate.

The interface screen 300 can include a data entry form 305 through which a particular rate can be specified. For example, an OCN template 310 can be provided to permit the third-party carrier to enter the OCN corresponding to the rate being entered. Further, a LATA template 315 can be used to permit entry of the LATA corresponding to the rate being entered. The OCN template 310 and LATA template 315 can be implemented using a single text entry box, a plurality of text entry boxes, one or more drop down menus, or any other data entry template known in the art. Further, the OCN template 310 and LATA template 315 can be restricted such that only valid OCN and LATA data can be entered. In some implementations, indicators other than the LATA and OCN can be used to identify a particular rate, such as NPA NXX. Thus, the data entry form 305 can include one or more templates configured to permit entry of such indicators.

A rate corresponding to the LATA-OCN combination, or other such rate identifier, can be entered into a rate field 320. The rate can be expressed in cost per minute, such as in a dollar and cents format. In an implementation, values representing fractional cents can be entered. Alternatively, any other standardized cost measure can be used. A single rate can be specified by entering data into the OCN template 310, the LATA template 315, or one or more other rate identifier templates, and the rate field 320. Alternatively, a third-party carrier can bulk load multiple rates by identifying a file to be uploaded in a file field 325. The filename, including a directory path, of the file to be uploaded can be entered directly into the file field 325. Alternatively, a browse button 330 can be selected to permit the third-party carrier to navigate to the logical storage location of the desired file.

The interface screen 300 also can include a plurality of command buttons. For example, a cancel button 335 can be included to permit a third-party carrier to cancel the one or more rates entered into the data entry form 305, such that the one or more entered rates are not used for call routing purposes. A submit button 340 can be included to permit the third-party carrier to submit the one or more rates entered into the data entry form 305 to the least cost routing server. Once submitted, the rate associated with a received LATA-OCN combination can replace any corresponding rate that was previously entered.

Further, one or more business rules can be applied before a new rate is accepted by the least cost routing server. For example, one or more business rules can be implemented to restrict the number of times a rate can be revised over a given period of time. The business rules also can be implemented to verify the LATA-OCN combination, such as to ensure that the one or more rates being submitted are valid. For example, the LATA-OCN combination associated with a bid can be analyzed to determine that the combination corresponds to an existing LATA-OCN.

Additionally, an analyze button 345 can be included to permit the third-party carrier to view a projection of the anticipated results associated with the one or more rates specified in the data entry form 305. The analysis can be generated before the one or more rates are submitted to the least cost routing server. If the third-party carrier is satisfied with the anticipated results, the one or more rates can be submitted to the least cost routing server. Otherwise, the one or more rates can be canceled.

In some implementations, time-based routing can be implemented. In a time-based routing implementation, a third-party carrier also can specify the time period for which a rate is valid. For example, a first rate can be in effect from 7:00 am until 7:00 pm and a second rate can be in effect from 7:01 pm until 6:59 am. Further, a time-based routing implementation also can be configured to account for the day of the week.

Figure 4:
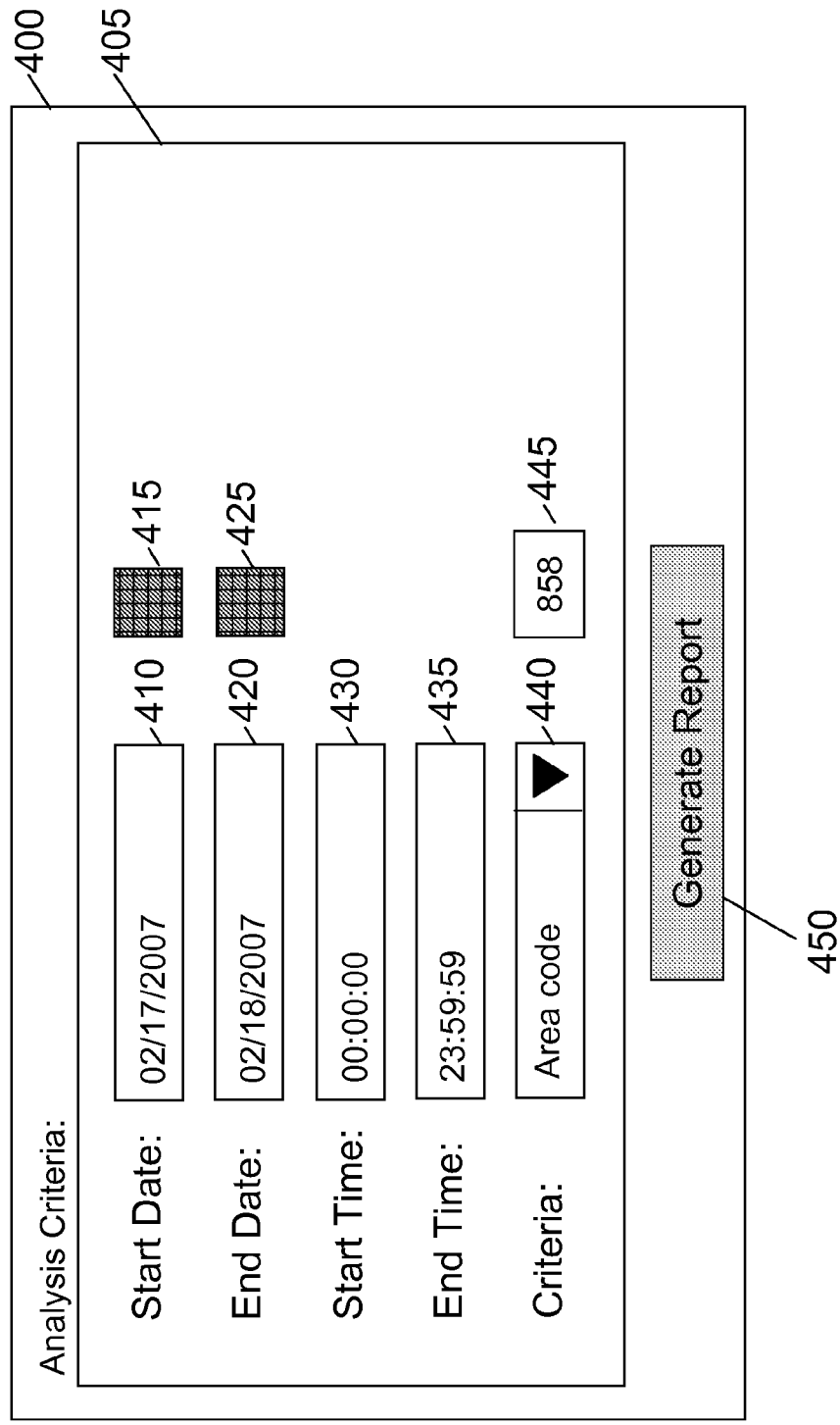
FIG. 4 shows an example of an analysis interface screen.

FIG. 4 shows an example of an analysis interface screen 400 through which a third-party carrier can enter a request to analyze the effect of one or more changes to the third-party carrier's rates. As with the interface screen 300 corresponding to rate changes, the analysis interface screen 400 can be accessed over a network connection, such as a connection to a public or private network. Further, access to the analysis interface screen 400 can be restricted to authorized parties and data transmitted over the network connection can be encrypted.

The analysis interface screen 400 can include a data entry form 405 through which a particular report can be generated. The data entry form 405 can include a start date field 410 and an end date field 420 for receiving dates indicating the start and end of an analysis period. The analysis period defines the period over which historical data will be analyzed with respect to the newly entered rates. Thus, the results can indicate the business effect that one or more newly entered rates would have had if they had been in use during the specified period. A start date calendar icon 415 and an end date calendar icon 425 also can be provided. Selecting the start date calendar icon 415 or the end date calendar icon 425 can cause a calendar to be displayed, from which a specific date can be selected.

Further, the data entry form 405 can include a start time field 430 and an end time field 435 for receiving times indicating the start and end times of an analysis period. Thus, an analysis period can be further customized to indicate the impact of one or more rate changes over a specific time period. In an implementation, a default start time and end time can be defined. For example, a default time period can be specified such that the maximum time period corresponding to the specified date range is utilized.

Additionally, a criteria field 440 also can be included in the data entry form 405. The criteria field 440 can be configured to specify one or more additional analysis criteria to be considered. For example, the criteria field 440 can be set to "Area Code" and a particular area code can be specified in an associated data field 445. Thus, the analysis generated with respect to the newly entered rates can be limited to a specific location. Other criteria also can be included in the criteria field 440, such as national, international, and one or more countries. Any data corresponding to the criteria specified in the criteria field 440 can be entered in the associated data field 445. In some implementations, the criteria field 440 can be implemented as a drop-down menu from which one or more entries can be selected. Further, an entry of "NONE" can be preselected as the default so that no additional filtering is performed unless specified by the third-party carrier entering the analysis request. Once the analysis criteria have been established, a Generate Report button 450 can be selected to submit the analysis request.

FIG. 5 shows an example of an analysis report 500 indicating the projected effect of one or more entered rate changes. The example analysis report 500 reflects the use of the 858 area code as analysis criteria. An analysis report also can be generated using any other criteria or no such criteria. As discussed above, the entered rate changes can be proposed rate changes that have not yet been submitted to the least cost routing server for use in updating the least cost routing database. Further, the entered rate changes can be canceled if the projected effect is not satisfactory.

The analysis report 500 can include a carrier identifier 502, which identifies the third-party requesting the analysis report. For example, the carrier identifier 502 can indicate the name of the third-party carrier, such as MobileCom. The analysis report also can include a date range 505 that indicates the period for which historical data was analyzed with respect to the one or more entered rates. Further, the analysis report 500 can include a chart 510 that identifies the actual results based on the effective rates at the time the data was recorded and the results based on the newly entered rates. The chart 510 can include a plurality of columns corresponding to different data types, including an area code column 515, a region column 520, a duration column 525, an actual carrier column 530, an actual cost column 535, a projected carrier column 540, and a projected cost column 545. Further, the analysis report 500 can be configured to include additional columns and/or to exclude one or more of the presently included columns.

The chart 510 also includes a plurality of rows corresponding to the duration and cost of telephone calls actually routed through third-party carriers to the one or more relevant locations, e.g., the 858 area code, during the analysis period. For example, the first row 550 of the chart 510 indicates that 2,134 minutes of telephone calls were routed through the third-party carrier Telecom1 at an actual cost of $40.7507. Further, the second row of the chart 510 indicates that 2,926 minutes of telephone calls were routed through the third-party carrier MobileCom at an actual cost of $55.8925.

Further, the first row 550, the second row 555, and the fourth row 565 show that, based on the rates entered by MobileCom, all of the minutes corresponding to those rows would have been routed through MobileCom if the entered rate had been in use during that period. Thus, the third-party carrier MobileCom can evaluate the entered rates based on the number of minutes that would have been routed through MobileCom over a preceding period. Further, the chart 510 can include a projected cost column 545 that displays the projected cost associated with the minutes of telephone calls that would have been routed through the third-party carrier based on the entered rates. If the minutes of telephone calls and corresponding projected costs based on the entered rates are satisfactory, the third-party carrier can submit the one or more entered rates.

Figure 6:
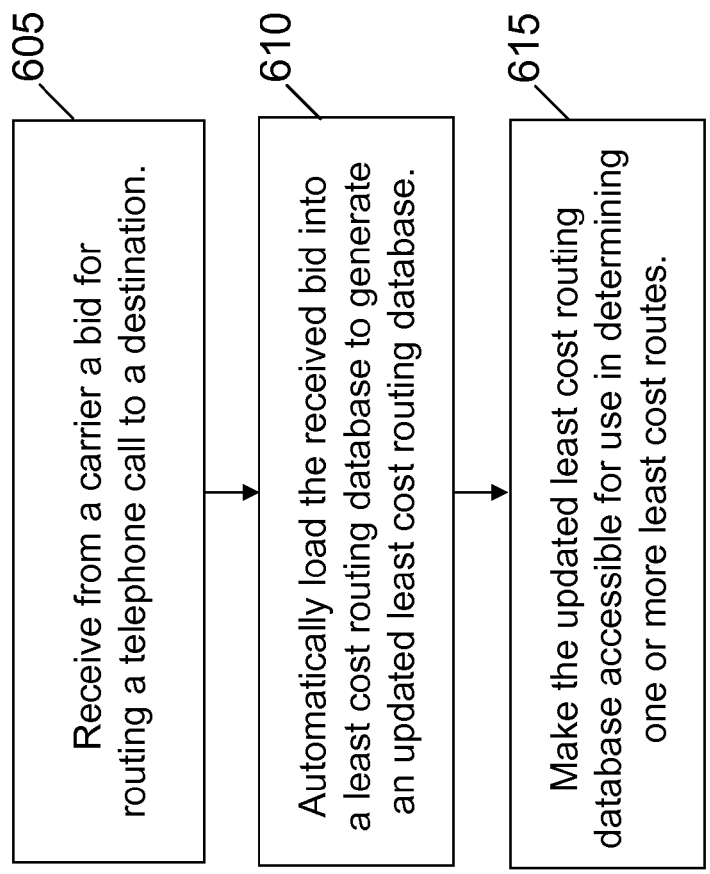
FIG. 6 shows an exemplary flowchart for a method of populating a least cost routing database.

FIG. 6 shows an exemplary flowchart for a method of populating a least cost routing database. In populating the least cost routing database, a bid is received from a carrier for routing a telephone call to a destination (605). The received bid is automatically loaded into a least cost routing database to generate an updated least cost routing database (610). Once the received bid has been loaded, the updated least cost routing database is made accessible for use in determining one or more least cost routes (615).

A number of implementations have been disclosed herein. Nevertheless, it will be understood that various modifications may be made without departing from the spirit and scope of the claims. Accordingly, other implementations are within the scope of the following claims.

What is claimed is:

1. A method of populating a least cost routing database, the method comprising:
   receiving from a carrier a bid for routing a telephone call to a destination;
   analyzing the received bid to generate a projected business result;
   presenting the projected business result to the carrier before loading the received bid into the least cost routing database;
   automatically loading the received bid into a least cost routing database to generate an updated least cost routing database; and
   making the updated least cost routing database accessible for use in determining one or more least cost routes.

2. The method of claim 1, wherein the bid is received from the carrier over a network.

3. The method of claim 2, wherein the destination is represented by a Local Access and Transport Area identifier.

4. The method of claim 1, wherein receiving a bid further comprises receiving a file identifier corresponding to a file comprising two or more bids.

5. The method of claim 1, further comprising:
   validating the received bid based on one or more business rules before loading the received bid into the least cost routing database.

6. The method of claim 5, further comprising:
   receiving input from the carrier specifying an historical period; and
   generating the projected business result based on data associated with the specified historical period.

7. The method of claim 1, wherein automatically loading the received bid into the least cost routing database further comprises replacing a corresponding previous bid.

8. The method of claim 1 further comprising receiving a second bid from the carrier responsive to the presenting of the projected business result.

9. The method of claim 1, wherein the project business result corresponds to projected costs attributable to the carrier based on the received bid and based on historical information.

10. A computer program product, encoded on a computer-readable medium, operable to cause data processing apparatus to perform operations comprising:
    receiving from a carrier a bid for routing a telephone call to a destination;
    analyzing the received bid to generate a projected business result;
    presenting the projected business result to the carrier before loading the received bid into the least cost routing database;
    automatically loading the received bid into a least cost routing database to generate an updated least cost routing database; and
    making the updated least cost routing database accessible for use in determining one or more least cost routes.

11. The computer program product of claim 10, wherein the bid is received from the carrier over a network.

12. The computer program product of claim 11, wherein the destination is represented by a Local Access and Transport Area identifier.

13. The computer program product of claim 10, wherein receiving a bid further comprises receiving a file identifier corresponding to a file comprising one or more bids.

14. The computer program product of claim 10, further operable to cause data processing apparatus to perform operations comprising:
    validating the received bid based on one or more business rules before loading the received bid into the least cost routing database.

15. The computer program product of claim 14, further operable to cause data processing apparatus to perform operations comprising:
    receiving input from the carrier specifying an historical period; and
    generating the projected business result based on data associated with the specified historical period.

16. The computer program product of claim 10, further operable to cause data processing apparatus to perform operations comprising: replacing a corresponding previous bid upon automatically loading the received bid into the least cost routing database.

17. The computer program product of claim 10 further comprising receiving an updated bid from the carrier responsive to the presenting of the projected business result.

18. A system comprising:
    a computer-readable medium storing a least cost routing database; and
    a computing system including processor electronics configured to perform operations comprising:
    receiving from a carrier a bid for routing a telephone call to a destination;
    analyzing the received bid to generate a projected business result; and
    presenting the projected business result to the carrier before loading the received bid into the least cost routing database;
    automatically loading the received bid into the least cost routing database to generate an updated least cost routing database; and
    making the updated least cost routing database accessible for use in determining one or more least cost routes.

19. The system of claim 18, wherein the bid is received from the carrier over a network.

20. The system of claim 19, wherein the destination is represented by a Local Access and Transport Area identifier.

21. The system of claim 18, wherein receiving a bid further comprises receiving a file identifier corresponding to a file comprising one or more bids.

22. The system of claim 18, wherein the processor electronics are further configured to perform operations comprising:
- validating the received bid based on one or more business rules before loading the received bid into the least cost routing database.

23. The system of claim 22, wherein the processor electronics are further configured to perform operations comprising:
- receiving input from the carrier specifying an historical period; and
- generating the projected business result based on data associated with the specified historical period.

24. The system of claim 18, wherein the processor electronics are further configured to perform operations comprising:
- replacing a corresponding previous bid upon automatically loading the received bid into the least cost routing database.

25. The system of claim 18, wherein the project business result corresponds to projected costs attributable to the carrier based on the received bid and based on historical information.

* * * * *